United States Patent
Ann et al.

(10) Patent No.: US 9,963,070 B2
(45) Date of Patent: May 8, 2018

(54) APPARATUS AND METHOD FOR DISPLAYING VEHICLE INFORMATION

(71) Applicant: Hyundai Motor Company, Seoul (KR)

(72) Inventors: Yun Sup Ann, Seoul (KR); Ju Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 769 days.

(21) Appl. No.: 14/534,875

(22) Filed: Nov. 6, 2014

(65) Prior Publication Data

US 2015/0375679 A1  Dec. 31, 2015

(30) Foreign Application Priority Data

Jun. 30, 2014  (KR) .......................... 10-2014-0081140

(51) Int. Cl.
  *B60R 1/00*  (2006.01)
(52) U.S. Cl.
  CPC .......... *B60R 1/00* (2013.01); *B60R 2300/205* (2013.01); *B60R 2300/308* (2013.01)
(58) Field of Classification Search
  CPC ............... B60R 1/00; B60R 2300/205; B60R 2300/308
  USPC ....................................................... 348/148
  See application file for complete search history.

(56) References Cited

U.S. PATENT DOCUMENTS

| | | | |
|---|---|---|---|
| 6,289,278 B1 | 9/2001 | Endo et al. | |
| 8,412,413 B1 | 4/2013 | Stark et al. | |
| 2004/0016870 A1* | 1/2004 | Pawlicki | G06T 7/13 |
| | | | 250/208.1 |
| 2014/0063064 A1* | 3/2014 | Seo | G08G 1/166 |
| | | | 345/633 |
| 2015/0138087 A1 | 5/2015 | Kim et al. | |

FOREIGN PATENT DOCUMENTS

| | | |
|---|---|---|
| JP | 2002-046501 A | 2/2002 |
| JP | 4141895 B2 | 8/2008 |
| KR | 10-2012-0066472 A | 6/2012 |
| KR | 10-2013-0089139 A | 8/2013 |
| KR | 10-2015-0056234 A | 5/2015 |

* cited by examiner

*Primary Examiner* — On S Mung
(74) *Attorney, Agent, or Firm* — Mintz Levin Cohn Ferris Glovsky and Popeo, P.C.; Peter F. Corless (57) ABSTRACT

A method for displaying vehicle information includes: photographing a front image of a driver's own vehicle at a time of driving with a cruise control feature activated; overlappingly matching the front image with an augmented reality display region of a head-up display; performing image analysis on the front image after the front image matches the augmented reality display region; determining a position of a preceding vehicle within the augmented reality display region according to the image analysis result; and controlling a display of the preceding vehicle information according to the position of the preceding vehicle.

17 Claims, 9 Drawing Sheets

Fig.9

APPARATUS AND METHOD FOR DISPLAYING VEHICLE INFORMATION

CROSS-REFERENCE TO RELATED APPLICATION

This application is based on and claims under 35 U.S.C. § 119(a) the benefit of Korean Patent Application No. 10-2014-0081140, filed on Jun. 30, 2014 in the Korean Intellectual Property Office, the disclosure of which is incorporated herein in its entirety by reference.

BACKGROUND (a) Field of the Invention

The present disclosure relates to an apparatus and a method for displaying vehicle information capable of preventing visibility from being degraded by controlling a display of preceding vehicle information depending on a position of a preceding vehicle within an augmented reality display region of a head-up display (HUD) at the time of driving with a cruise control feature activated.

(b) Description of the Related Art

Generally, a head-up display (HUD) mounted in a vehicle displays main information required for driving on the front glass of a vehicle. For example, the head-up display displays vehicle information, such as a vehicle speed, warning matters when a vehicle is driving on a road, rear-side warning, smart cruise control (SCC) information, lane keeping assist system (LKAS) information, and the like.

The head-up display may allow a driver to directly confirm required driving information in a state in which the driver keeps his or her eyes forward so as to minimize a driver's eye movement, thereby improving driving safety.

Figure 1:
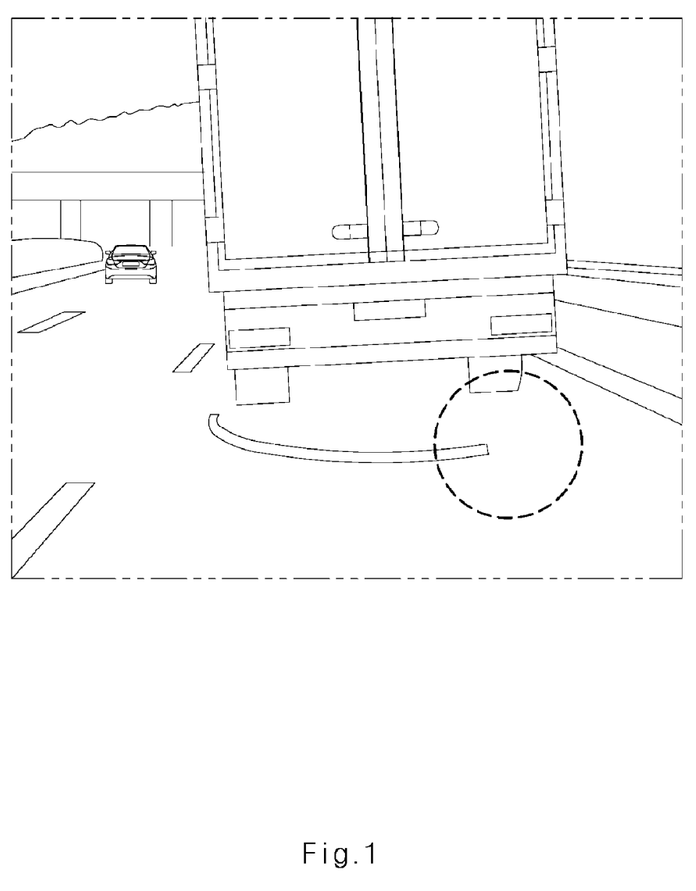
FIG. 1 is an exemplified diagram illustrating a truncation of preceding vehicle marking according to the related art.

Existing head-up displays output in an overlapping manner a preceding vehicle mark instructing a preceding vehicle (following vehicle) sensed by a smart cruise control system and an inter-vehicle distance mark indicating a distance between the preceding vehicle and a driver's own vehicle on a reality screen seen with the driver's eyes to implement augmented reality (AR). In this case, the head-up display adjusts a mark size based on a vehicle width of the preceding vehicle included in a front image (reality screen) photographed by a front camera. Therefore, the head-up display performs a control to reduce a size of the preceding vehicle mark displayed on an eyebox of a head-up display screen (information display region) when the preceding vehicle is away from the driver's own vehicle and thus the size of the preceding vehicle seen on the reality screen is reduced, such that visibility may be degraded. On the other hand, the head-up display causes a truncation that since the preceding vehicle approaches the driver's own vehicle and thus the size of the preceding vehicle seen on the reality screen is increased, as illustrated in FIG. 1, the preceding vehicle mark deviates from the eyebox and thus a portion of the preceding vehicle mark is truncated.

Further, even when a driver's own vehicle drives around a sharp curve, the phenomenon that the mark displayed by the head-up display is truncated and displayed occurs.

SUMMARY

An aspect of the present invention provides an apparatus and a method for displaying vehicle information capable of controlling a display of preceding vehicle information depending on a position of a preceding vehicle within an augmented reality display region of a head-up display MUD) at the time of driving with a cruise control feature activated.

According to an exemplary embodiment of the present invention, a method for displaying vehicle information includes: photographing a front image of a vehicle (i.e., the driver's own vehicle) at the time of driving with a cruise control feature activated; overlappingly matching the front image with an augmented reality display region of a head-up display; performing image analysis on the front image after the front image matches the augmented reality display region; determining a position of a preceding vehicle within the augmented reality display region according to the image analysis result; and controlling a display of the preceding vehicle information according to the position of the preceding vehicle.

The photographing of the front image may include matching the front image with a two-dimensional coordinate system.

The performing of the image analysis may include: extracting a preceding vehicle region from the front image; and comparing boundary information of the preceding vehicle region with boundary information of the augmented reality display region.

The comparing of the boundary information may include: extracting coordinate values of both endpoints of a lower side of the preceding vehicle region; and comparing the coordinate values of both endpoints with coordinate values of apexes of the augmented reality display region.

In the determining of the position of the preceding vehicle, when only any one of both endpoints of the lower side of the preceding vehicle region extracted from the front image is positioned within the augmented reality display region, it may be determined that a portion of one side of the preceding vehicle deviates from the augmented reality display region.

In the controlling of the display of the preceding vehicle information, when a width of an overlapping region between the preceding vehicle region and the augmented reality display region is less than a reference width, a display position, a size, and a form of the preceding vehicle information may be controlled.

In the determining of the position of the preceding vehicle, when both endpoints of the lower side of the preceding vehicle region are positioned within the augmented reality display region and when the lower side of the preceding vehicle region is positioned within a reference distance from an upper side of the augmented reality display region, it may be determined that the preceding vehicle is positioned at an uppermost end of the augmented reality display region.

In the controlling of the display of the preceding vehicle information, when the preceding vehicle is positioned at the uppermost end of the augmented reality display region, it may be confirmed whether a vehicle width of the preceding vehicle is less than a reference width and as the confirmation result, when the vehicle width of the preceding vehicle is less than the reference width, a display size of the preceding vehicle information may be controlled and output.

In the determining of the position of the preceding vehicle, when the lower side of the preceding vehicle region is positioned within the reference distance from the lower side of the augmented reality display region, the preceding vehicle may be positioned at the lowermost end of the augmented reality display region.

In the controlling of the display of the preceding vehicle information, it may be confirmed whether a sum of a height of the overlapping region between the preceding vehicle region and the augmented reality display region and a height of the preceding vehicle information exceeds a height of the augmented reality display region and when the sum of the two heights exceeds the height of the augmented reality display region, a display position, a size, and a form of the preceding vehicle information may be controlled.

According to another exemplary embodiment of the present invention, an apparatus for displaying vehicle information includes: a front camera configured to photograph a front image of a vehicle; a DISPLAY configured to display preceding vehicle information with augmented reality at the time of driving with a cruise control feature activated; and a controller configured to overlappingly match the augmented reality display region of the DISPLAY and the front image, determine a position of the preceding vehicle within the augmented reality display region through image analysis on the front image, and control display attribute of the preceding vehicle information according to the position of the preceding vehicle.

The DISPLAY may be implemented as an augmented reality head-up display.

The display attribute may include a display position, a size, and a form.

The controller may extract a preceding vehicle region from the front image, extract both endpoints of a lower side of the extracted preceding vehicle region, and when only any one of both endpoints of the lower side is positioned within the augmented reality display region, determine that a portion of one side of the preceding vehicle deviates from the augmented reality display region.

The controller may extract an overlapping region between the preceding vehicle region and the augmented reality display region and control a position, a form, and a size of the preceding vehicle information when a width of the overlapping region is less than a reference width.

The controller may determine that the preceding vehicle is positioned at an uppermost end of the augmented reality display region when both endpoints of the lower side of the preceding vehicle region are positioned within the augmented reality display region and the lower side of the preceding vehicle region is positioned within a reference distance from an upper side of the augmented reality display region.

The controller may extract an overlapping region between the preceding vehicle region and the augmented reality display region, and control a size of the preceding vehicle information to the reference width when a width of the overlapping region is less than a reference width.

The controller may determine that the preceding vehicle is positioned at an lowermost end of the augmented reality display region when both endpoints of the lower side of the preceding vehicle region are positioned within the augmented reality display region and the lower side of the preceding vehicle region is positioned within a reference distance from a lower side of the augmented reality display region.

The controller may extract the overlapping region between the preceding vehicle region and the augmented reality display region and when a sum of the height of the overlapping region and the height of the preceding vehicle information exceeds the height of the augmented reality display region, control the position, form, and size of the preceding vehicle information.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention relates to an augmented reality head-up display (AR-HUD) which overlappingly displays virtual information associated with a preceding vehicle (following vehicle) sensed by a smart cruise control system on a reality screen seen with the driver's eyes. Here, the virtual information includes a preceding vehicle display (mark), an actually measured inter-vehicle distance between the preceding vehicle and a driver's own vehicle, and the like and is displayed in forms such as image, icon, diagram, symbol, text, and graphic.

Figure 2:
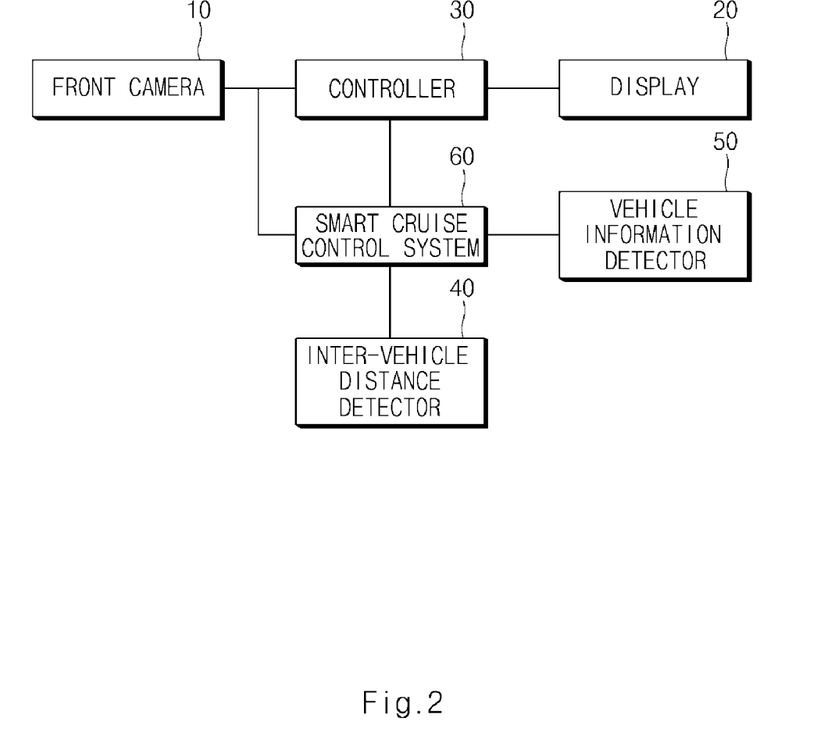
FIG. 2 is a block configuration diagram of an apparatus for displaying vehicle information according to an exemplary embodiment of the present invention.
Figure 3:
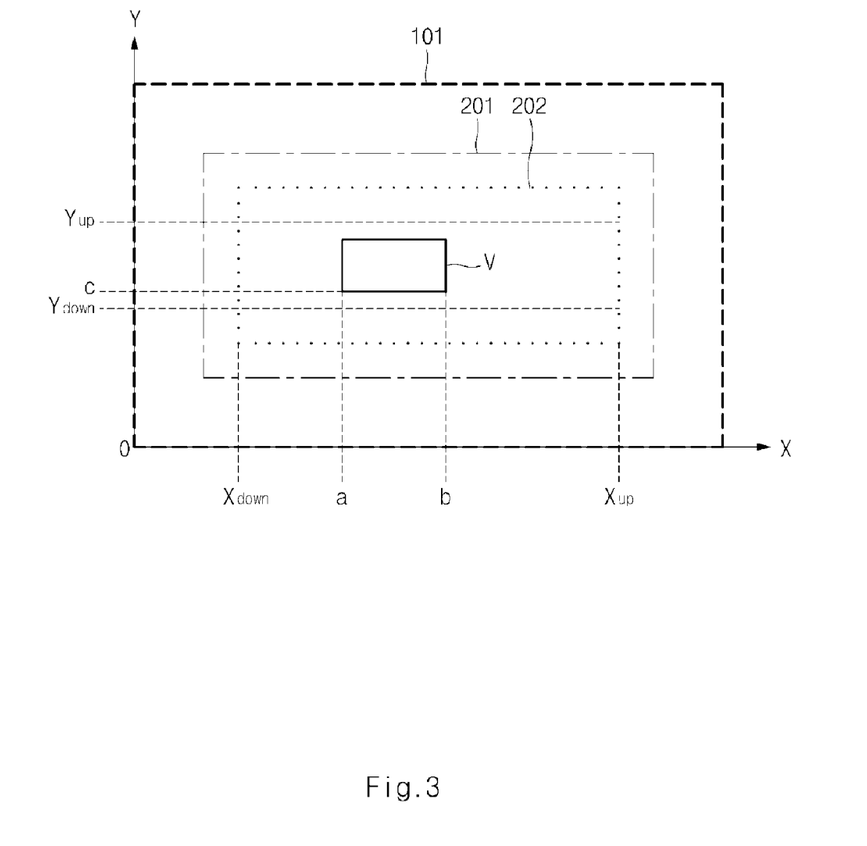
FIG. 3 is an exemplified diagram illustrating overlapping matching of a front image, an information display region, and an augmented reality display region according to the exemplary embodiment of the present invention.

FIG. 2 is a block configuration diagram of an apparatus for displaying vehicle information according to an exemplary embodiment of the present invention and FIG. 3 is an exemplified diagram illustrating overlapping matching of a front image, an information display region, and an augmented reality display region according to the exemplary embodiment of the present invention.

Referring to FIG. 2, the apparatus for displaying vehicle information includes a front camera 10, a DISPLAY 20, a controller 30, an inter-vehicle distance detector 40, a vehicle information detector 50, a smart cruise control system 60, and the like.

The front camera 10 is mounted on a front surface of the vehicle to photograph a front image. The front camera 10 may also include an image processor (not illustrated) which performs image processing such as color correction, color conversion, image format conversion, enlargement, reduction, and rotation on the photographed front image. As illustrated in FIG. 3, the image processor (not illustrated) may also serve to match a front image 101 photographed by the front camera 10 with two-dimensional coordinate systems (normal coordinate system, pixel coordinate system).

The DISPLAY 20 displays vehicle information required for driving on windshield glass of a vehicle. Here, the vehicle information includes a preceding vehicle mark sensed by the smart cruise control system 60, an actually measured inter-vehicle distance between a preceding vehicle and a driver's own vehicle, operation information (setting or release) of the smart cruise control system 60, a set inter-vehicle distance, a set vehicle speed, the driver's own vehicle speed, driving road information (straight road, curved road, expressway, general road, and the like), a fuel level, and the like.

Further, the DISPLAY 20 is implemented as an augmented reality head-up display (AR-HUD) which overlappingly displays the vehicle information on a reality screen seen with the driver's eyes. As illustrated in FIG. 3, a display screen of the DISPLAY 20 includes an information display region 201 which displays the vehicle information by a general display method and an augmented reality display region 202 which displays the preceding vehicle information with augmented reality. The information display region 201 is determined by an overall display size of the augmented reality head-up display and the augmented reality display region 202 is a region which is allocated to the information display region 201 and displays information with the augmented reality. The augmented reality display region 202 is an eyebox which may allow a driver to clearly see an image displayed by the augmented reality head-up display.

For example, the DISPLAY 20 displays preceding vehicle instruction information instructing a preceding vehicle and preceding vehicle information such as inter-vehicle distance information indicating the actually measured inter-vehicle distance between the preceding vehicle and the driver's own vehicle on the augmented reality display region 202. For example, the DISPLAY 20 overlappingly displays the preceding vehicle instruction information at a lower end of the preceding vehicle and overlappingly displays the inter-vehicle distance information on a road between the preceding vehicle and the driver's own vehicle, by matching the front image 101 photographing the reality screen with the augmented reality display region 202.

The controller 30 controls display attributes such as a display position, a form, and a size of an indicator of the preceding vehicle information displayed on the augmented reality display region 202. In this case, the controller 30 determines the size of the preceding vehicle information depending on a vehicle width of the preceding vehicle extracted from the front image 101 photographed by the front camera 10. That is, the controller 30 sets a width of the preceding vehicle information to be the vehicle width of the preceding vehicle and determines a height of the preceding vehicle information at a predetermined ratio with respect to the width of the preceding vehicle information.

The controller 30 matches the front image 101 transmitted from the front camera 10 with the two-dimensional coordinate systems (normal coordinate system, pixel coordinate system). Further, as illustrated in FIG. 3, the controller 30 overlappingly displays the front image 101, the information display region 201, and the augmented reality display region 202 and analyzes the front image 101 in the matched state.

The controller 30 confirms the position of the preceding vehicle within the augmented reality display region 202 by the image analysis. That is, the controller 30 extracts a preceding vehicle region V from the front image 101 and compares the extracted preceding vehicle region V with boundary information (boundary coordinates) of the augmented reality display region 202 to determine the position of the preceding vehicle within the augmented reality display region 202.

In this case, the controller 30 extracts coordinate values of both endpoints of a low side (lower end of a vehicle) of the preceding vehicle region V. Referring to FIG. 3, both endpoints of the lower side of the preceding vehicle region V are leftmost points a and c and rightmost points b and c. The controller 30 confirms whether both endpoints of the lower side of the preceding vehicle region V are positioned within the augmented reality display region 202. The controller 30 compares the coordinate values of both endpoints of the lower side of the preceding vehicle region V with coordinate values of four apexes of the augmented reality display region 202 to determine the position of the preceding vehicle within the augmented reality display region 202.

The controller 30 determines that the preceding vehicle is positioned at the outermost end of the augmented reality display region 202 when only one of both endpoints of the lower side of the preceding vehicle region V is positioned within the augmented reality display region 202 ($X_{down} \leq a \leq X_{up}$ or $X_{down} \leq b \leq X_{up}$). That is, the controller 30 recognizes that a portion of the left or right of the preceding vehicle deviates from the augmented reality display region 202.

In this case, the controller 30 extracts the overlapping region between the preceding vehicle region V and the augmented reality display region 202 when a portion of the preceding vehicle deviates to the side of the augmented reality display region 202. Further, the controller 30 confirms whether a width (length of the lower side, vehicle width) of the overlapping region is less than a reference width. The controller 30 controls and outputs the display position, size, form, and the like of the displayed preceding vehicle information when the width of the overlapping region is less than the reference width. Meanwhile, the controller 30 determines the display size of the preceding vehicle information based on the width of the overlapping region when the width of the overlapping region is equal to or larger than the reference width.

Meanwhile, the controller 30 confirms whether the lower side of the preceding vehicle region V is positioned within a set reference distance from a lower side or an upper side of the augmented reality display region 202 when both endpoints of the lower side of the preceding vehicle region V are positioned within the augmented reality display region 202 ($X_{down} \leq a \leq X_{up}$ and $X_{down} \leq b \leq X_{up}$).

The controller 30 determines that the preceding vehicle is positioned to approach an uppermost end of the augmented reality display region 202 when the lower side of the preceding vehicle region V is positioned within the set reference distance from the upper side of the augmented reality display region 202 ($c > Y_{up}$). That is, the controller 30 recognizes that the preceding vehicle is too far away from the driver's own vehicle.

Alternatively, the controller 30 determines that the preceding vehicle is positioned to approach a lowermost end of the augmented reality display region 202 when the lower side of the preceding vehicle region V is positioned within the set reference distance from the lower side of the augmented reality display region 202 ($c < Y_{down}$). That is, the controller 30 recognizes that the preceding vehicle is too close to the driver's own vehicle.

The controller 30 extracts the overlapping region between the preceding vehicle region V and the augmented reality display region 202 when the preceding vehicle is positioned at the uppermost end of the augmented reality display region 202. Further, the controller 30 confirms whether the width (length of the lower side) of the overlapping region is less than a reference width. The controller 30 controls and outputs the display size of the displayed preceding vehicle information to a preset minimum size when the width of the overlapping region is less than the reference width. Meanwhile, the controller 30 determines the display size of the preceding vehicle information based on the width of the overlapping region when the width of the overlapping region is equal to or more than the reference width.

The controller 30 confirms whether a sum of a height of the overlapping region and a height of the preceding vehicle information display exceeds a height of the augmented reality display region 202 when the width of the overlapping region is equal to or larger than the reference width. The controller 30 controls and outputs the display position, form, size, and the like of the preceding vehicle information if it is determined that the sum of the height of the overlapping region and the height of the preceding vehicle information display exceeds the height of the augmented reality display region 202. For example, the controller 30 displays the preceding vehicle information at the other side of the preceding vehicle or moves and displays the preceding vehicle to the information display region.

As such, the controller 30 controls the display of the vehicle information in consideration of the position of the preceding vehicle within the augmented reality display region 202. In other words, the controller 30 controls a size, a position, a form, a type, and the like for the display of the vehicle information according to the position of preceding vehicle.

The inter-vehicle distance detector 40 measures a distance between the preceding vehicle (following vehicle) positioned in front of the driver's own vehicle and driver's the own vehicle by a radar sensor, an infrared sensor, a LiDAR sensor, and the like. The inter-vehicle distance detector 40 is used to monitor whether a distance between the driver's own vehicle and the preceding vehicle is maintained to be constant at the time of driving with a cruise control feature activated.

The vehicle information detector 50 detects the vehicle information such as a posture and a speed of the vehicle by various sensors which are installed in the vehicle. Here, various sensors include a gyro sensor, a yaw rate sensor, a steering angle sensor, a wheel speed sensor, and the like. The vehicle information detector 50 is connected to sensors through a controller area network (CAN) bus interface.

The smart cruise control system 60 controls the driving of the driver's own vehicle based on information which is provided from the inter-vehicle distance detector 40 and the vehicle information detector 50. The smart cruise control system 60 controls an operation of a braking apparatus or a driving apparatus of a driver's own vehicle to sense the preceding vehicle to be followed and drive the driver's own vehicle while maintaining a constant distance from the sensed preceding vehicle.

The apparatus for displaying vehicle information includes a user input unit for receiving a user input (smart cruise control system setting/releasing command, distance between the preceding vehicle and the driver's own vehicle, driving speed setting information, and the like), a memory in which various kinds of data such as data generated depending on an operation and reference data are input, and the like.

Figure 4:
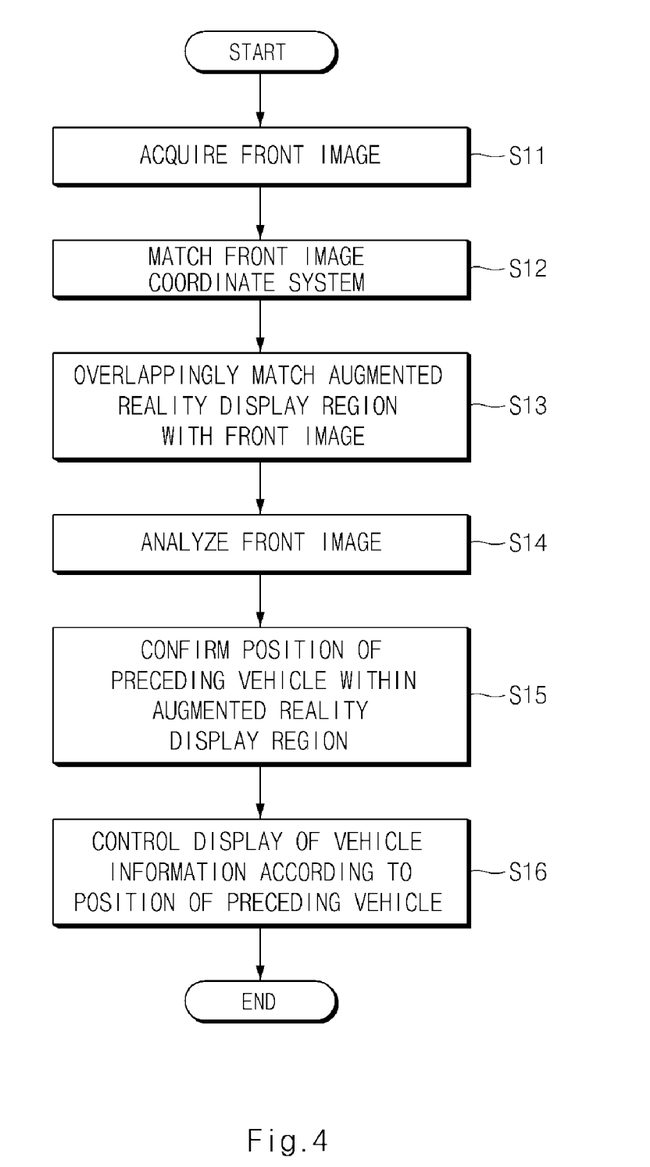
FIG. 4 is a flow chart illustrating a method for displaying vehicle information according to an exemplary embodiment of the present invention.

FIG. 4 is a flow chart illustrating a method for displaying vehicle information according to an exemplary embodiment of the present invention.

Referring to FIG. 4, the controller 30 of the apparatus for displaying vehicle information acquires the front image 101 of the vehicle through the front camera 10 at the time of the driving with a cruise control feature activated (S11). In this case, when the operation of the smart cruise control system 60 is turned on by a driver, the smart cruise control system 60 controls the braking apparatus and the driving apparatus of the driver's own vehicle to sense the preceding vehicle to be followed and maintain a constant distance from the sensed preceding vehicle.

The controller 30 matches the front image 101 acquired through the front camera 10 with the two-dimensional coordinate system (S12).

The controller 30 overlappingly matches the front image 101 with the augmented reality display region 202 (S13).

The controller 30 extracts the preceding vehicle from the front image 101 and extracts the boundary information of the extracted preceding vehicle (S14). That is, the controller 30 extracts the preceding vehicle region V from the front image 101 and extracts the coordinate values of both endpoints of the lower side of the extracted preceding vehicle region V.

The controller 30 compares the boundary information of the augmented reality display region 202 with the boundary information of the preceding vehicle to confirm the position of the preceding vehicle on the augmented reality display region 202 (S15). The controller 30 confirms whether both endpoints of the lower side of the preceding vehicle region V are positioned within the augmented reality display region 202. Here, the controller 30 recognizes that a portion of the preceding vehicle deviates to one side of the augmented reality display region 202 when only one of both endpoints of the lower side of the preceding vehicle region V is positioned within the augmented reality display region 202. That is, the controller 30 determines that the preceding vehicle is positioned at the right end of the augmented reality display region when the left endpoint of the lower side of the preceding vehicle region V is positioned within the augmented reality display region 202. Meanwhile, the controller 30 determines that the preceding vehicle is positioned at the left end of the augmented reality display region 202 when the right endpoint of the lower side of the preceding vehicle region V is positioned within the augmented reality display region 202.

Alternatively, the controller 30 confirms whether the lower side of the preceding vehicle region V is positioned within a predetermined distance from the upper side and the lower side of the augmented reality display region 202 when both endpoints of the lower side of the preceding vehicle region V are positioned within the augmented reality display region 202.

The controller 30 recognizes that the preceding vehicle is positioned at the uppermost end of the augmented reality display region 202 when the lower side of the preceding vehicle region V is positioned within a predetermined distance from the upper side of the augmented reality display region 202. Meanwhile, the controller 30 recognizes that the preceding vehicle is positioned at the lowermost end of the augmented reality display region 202 when the lower side of the preceding vehicle region V is positioned within a predetermined distance from the lower side of the augmented reality display region 202.

The controller 30 controls the display of the preceding vehicle information depending on the position of the preceding vehicle within the augmented reality display region 202 (S16). In this case, the controller 30 controls the display position, size, form, and the like of the preceding vehicle information.

The controller 30 confirms whether the width of the overlapping region between the preceding vehicle region V and the augmented reality display region 202 is less than the reference width when the preceding vehicle is positioned at the outermost end of the augmented reality display region 202. The controller 30 controls and outputs the display position, size, and form of the preceding vehicle information when the width of the overlapping region is less than the reference width.

Further, the controller 30 confirms whether the width of the overlapping region between the preceding vehicle region V and the augmented reality display region 202 is less than the reference width when the preceding vehicle is positioned at the uppermost end of the augmented reality display region 202. The controller 30 controls the display size of the preceding vehicle information to the preset minimum size when the width of the overlapping region is less than the reference width.

Further, the controller 30 confirms whether a sum of the height of the overlapping region between the preceding vehicle region V and the augmented reality display region 202 and the height of the preceding vehicle information display exceeds the height of the augmented reality display region 202 when the preceding vehicle is positioned at the lowermost end of the augmented reality display region 202. The controller 30 controls and outputs the display position, size, and form of the preceding vehicle information if it is determined that the sum of the height of the overlapping region and the height of the preceding vehicle information display exceeds the height of the augmented reality display region 202.

Figure 5:
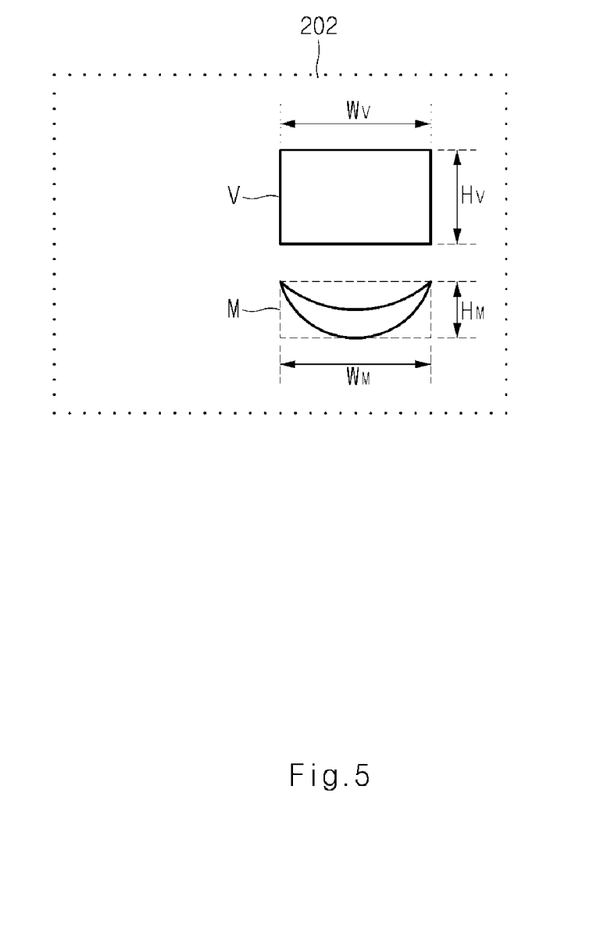
FIG. 5 is an example illustrating preceding vehicle information according to an exemplary embodiment of the present invention.

FIG. 5 is an example displaying the preceding vehicle information according to an exemplary embodiment of the present invention.

As illustrated in FIG. 5, the apparatus for displaying vehicle information according to the exemplary embodiment of the present invention confirms the position and size of the preceding vehicle V within the augmented reality display region 202. That is, the apparatus for displaying vehicle information detects a vehicle width (width) $W_v$ and height $H_v$ of the preceding vehicle V.

Further, the apparatus for displaying vehicle information displays a preceding vehicle instruction mark (preceding vehicle information) M at the lower end of the preceding vehicle V. In this case, the controller 30 of the apparatus for displaying vehicle information controls a width $W_M$ and a height $H_M$ of the preceding vehicle instruction mark M based on the vehicle width $W_v$ of the preceding vehicle V.

Figure 6:
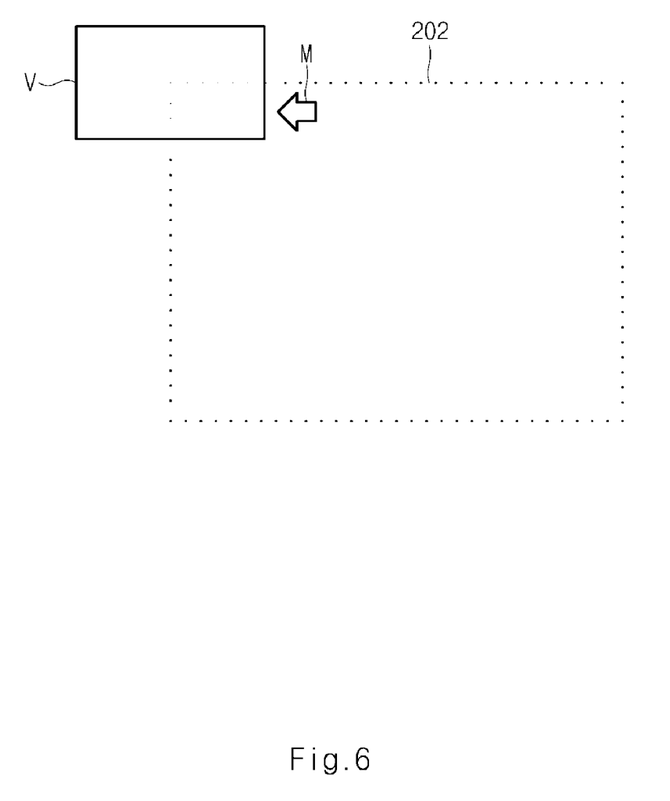
FIG. 6 is an example illustrating preceding vehicle information when a portion of one side of the preceding vehicle deviates from an augmented reality display region, according to the exemplary embodiment of the present invention.

FIG. 6 is an example displaying the preceding vehicle information when a portion of one side of the preceding vehicle deviates from the augmented reality display region, according to the exemplary embodiment of the present invention.

As illustrated in FIG. 6, when a portion of the left of the preceding vehicle V deviates from the augmented reality display region 202, the controller 30 changes and outputs the position and mark form displaying the preceding vehicle instruction mark M when the width of the overlapping region between the preceding vehicle V and the augmented reality display region 202 is less than the set reference width (minimum width). Here, the reference width may be a width of a preset minimum font.

Figure 7:
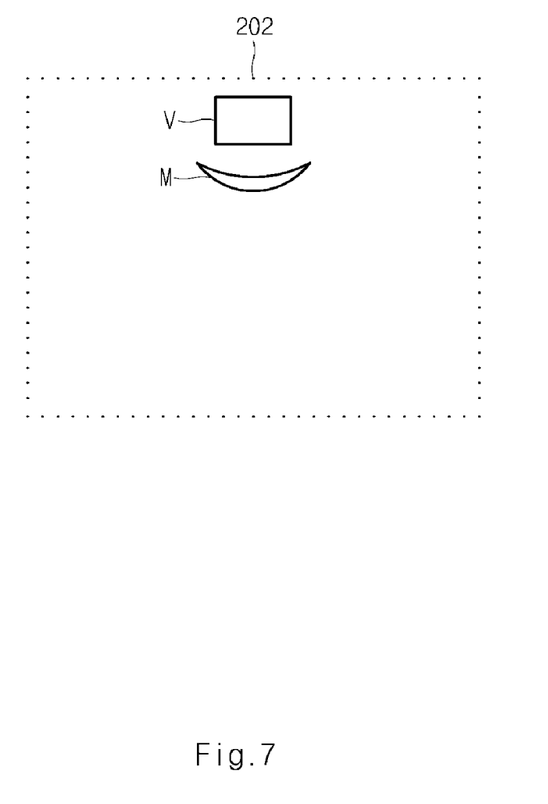
FIG. 7 is an example illustrating preceding vehicle information when the preceding vehicle is disposed at an uppermost end of the augmented reality display region, according to the exemplary embodiment of the present invention.

FIG. 7 is an example displaying the preceding vehicle information when the preceding vehicle is disposed at the uppermost end of the augmented reality display region, according to the exemplary embodiment of the present invention.

Referring to FIG. 7, when the preceding vehicle V is disposed at the uppermost end of the augmented reality display region 202, the controller 30 confirms whether the width of the preceding vehicle V overlapping with the augmented reality display region 202 is less than the reference width. Further, the controller 30 changes and outputs the width of the preceding vehicle instruction mark M to the reference width when the width of the overlapping region between the preceding vehicle V and the augmented reality display region 202 is less than the set reference width. Therefore, the exemplary embodiment of the present invention may prevent the size of the preceding vehicle instruction mark M from being less than the predetermined size, thereby securing the visibility of a predetermined level or more.

Figure 8:
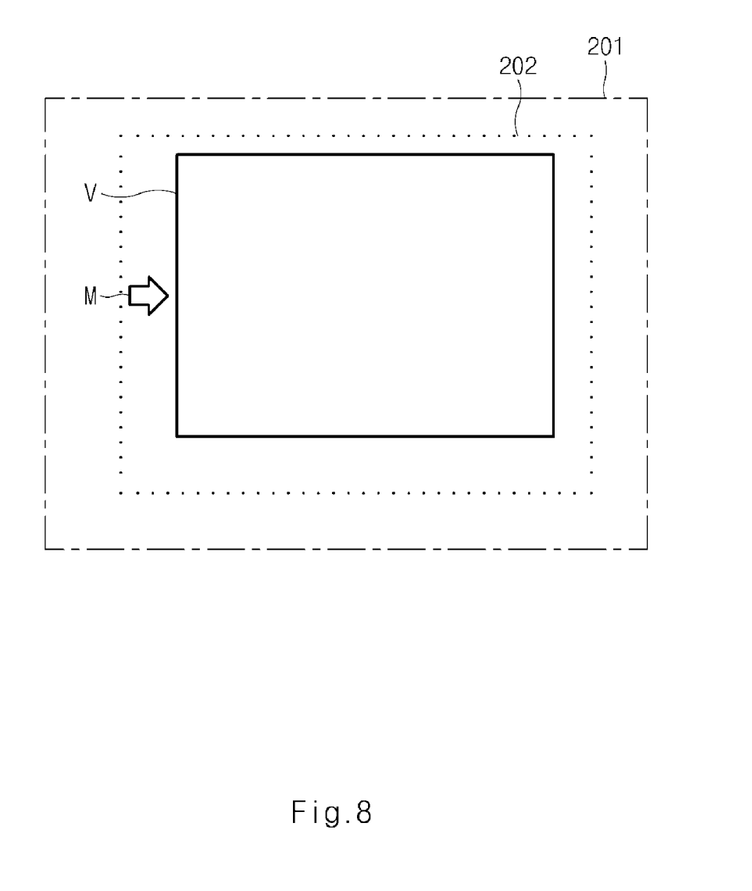
FIGS. 8 and 9 are exemplified diagrams illustrating preceding vehicle information when the preceding vehicle is disposed at a lowermost end of the augmented reality display region, according to the exemplary embodiment of the present invention.
Figure 9:
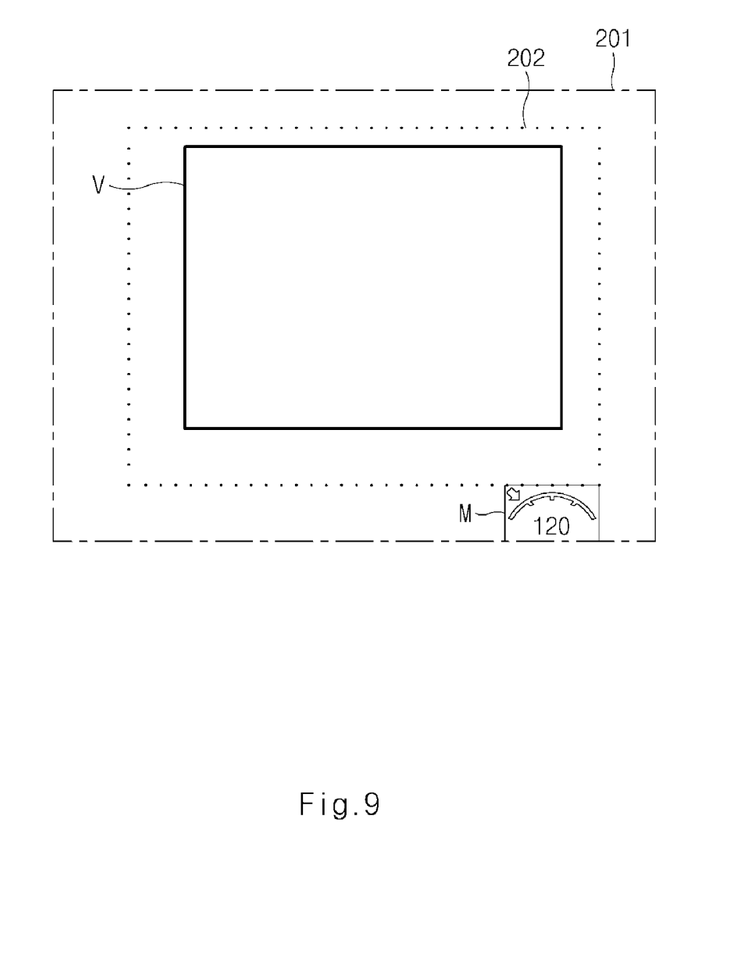

FIGS. 8 and 9 are exemplified diagrams displaying the preceding vehicle information when the preceding vehicle is disposed at the lowermost end of the augmented reality display region, according to the exemplary embodiment of the present invention.

As illustrated in FIGS. 8 and 9, when the lower end of the preceding vehicle V is positioned to approach the lower side of the augmented reality display region, the controller 30 confirms whether a sum $H_V+H_M$ of the height of the preceding vehicle region V overlapping with the augmented reality display region 202 and the height of the preceding vehicle instruction mark M exceeds the height of the augmented reality display region 202. As the confirmation result, when the sum $H_V + H_M$ of the height of the preceding vehicle region V overlapping with the augmented reality display region 202 and the height of the preceding vehicle instruction mark M exceeds the height of the augmented reality display region 202, the display attributes such as the display position and form of the preceding vehicle instruction mark M are controlled.

For example, as illustrated in FIG. 8, the preceding vehicle instruction mark M is displayed at one side of the preceding vehicle V or as illustrated in FIG. 9, the preceding vehicle instruction mark M is displayed in the information display region 201, not in the augmented reality display region 202.

As described above, according to the exemplary embodiments of the present invention, the display attributes such as the display position, shape, and size, and the like of the preceding vehicle information are controlled depending on the position of the preceding vehicle within the augmented reality display region of the head-up display (HUD) at the time of the driving with a cruise control feature activated, and therefore the visibility degradation of the preceding vehicle information displayed within the augmented reality display region may be prevented.

What is claimed is:

1. A method for displaying vehicle information, comprising:
   photographing a front image of a driver's own vehicle at a time of driving with a cruise feature activated;
   overlappingly matching the front image with an augmented reality display region of a head-up display;
   performing image analysis on the front image after the front image matches the augmented reality display region;
   determining a position of a preceding vehicle within the augmented reality display region according to the image analysis result; and
   controlling a display of a preceding vehicle information according to the position of the preceding vehicle,
   wherein the controlling of the display of the preceding vehicle information comprises controlling a display position, a display size, and a display form of the preceding vehicle information when a width of an overlapping region where a preceding vehicle region extracted from the front image overlaps the augmented reality display region is less than a reference width.

2. The method according to claim 1, wherein the photographing of the front image includes matching the front image with a two-dimensional coordinate system.

3. The method according to claim 1, wherein the performing of the image analysis includes:
   extracting the preceding vehicle region from the front image; and
   comparing boundary information of the preceding vehicle region with boundary information of the augmented reality display region.

4. The method according to claim 3, wherein the comparing of the boundary information includes:
   extracting coordinate values of both endpoints of a lower side of the preceding vehicle region; and
   comparing the coordinate values of both endpoints with coordinate values of apexes of the augmented reality display region.

5. The method according to claim 1, wherein in the determining of the position of the preceding vehicle, when only any one of both endpoints of a lower side of the preceding vehicle region is positioned within the augmented reality display region, it is determined that a portion of one side of the preceding vehicle deviates from the augmented reality display region.

6. The method according to claim 5, wherein in the determining of the position of the preceding vehicle, when both endpoints of the lower side of the preceding vehicle region are positioned within the augmented reality display region and when the lower side of the preceding vehicle region is positioned within a reference distance from an upper side of the augmented reality display region, it is determined that the preceding vehicle is positioned at an uppermost end of the augmented reality display region.

7. The method according to claim 6, wherein in the controlling of the display of the preceding vehicle information, when the preceding vehicle is positioned at the uppermost end of the augmented reality display region, it is confirmed whether a vehicle width of the preceding vehicle is less than a reference width and as the confirmation result, when the vehicle width of the preceding vehicle is less than the reference width, a display size of the preceding vehicle information is controlled and output.

8. The method according to claim 6, wherein in the determining of the position of the preceding vehicle, when the lower side of the preceding vehicle region is positioned within the reference distance from a lower side of the augmented reality display region, the preceding vehicle is positioned at a lowermost end of the augmented reality display region.

9. The method according to claim 8, wherein in the controlling of the display of the preceding vehicle information, it is confirmed whether a sum of a height of an overlapping region between the preceding vehicle region and the augmented reality display region and a height of the preceding vehicle information exceeds a height of the augmented reality display region and when the sum of the two heights exceeds the height of the augmented reality display region, a display position, a size, and a form of the preceding vehicle information are controlled.

10. An apparatus for displaying vehicle information, the apparatus comprising:
    a front camera configured to photograph a front image of a vehicle;
    a display configured to display preceding vehicle information with augmented reality at a time of driving with a cruise control feature activated; and
    a controller configured to overlappingly match an augmented reality display region of the display and the front image, determine a position of the preceding vehicle within the augmented reality display region through image analysis on the front image, and control display attribute of the preceding vehicle information according to the position of the preceding vehicle,
    wherein the controller is further configured to control a display position, a display size, and a display form of the preceding vehicle information when a width of an overlapping region where a preceding vehicle region extracted from the front image overlaps the augmented reality display region is less than a reference width.

11. The apparatus according to claim 10, wherein the display is implemented as an augmented reality head-up display.

12. The apparatus according to claim 10, wherein the display attribute includes a display position, a size, and a form.

13. The apparatus according to claim 10, wherein the controller extracts the preceding vehicle region from the front image, extracts both endpoints of a lower side of the extracted preceding vehicle region, and when only any one of both endpoints of the lower side is positioned within the augmented reality display region, determines that a portion of one side of the preceding vehicle deviates from the augmented reality display region.

14. The apparatus according to claim 13, wherein the controller determines that the preceding vehicle is positioned at an uppermost end of the augmented reality display region when both endpoints of the lower side of the preceding vehicle region are positioned within the augmented reality display region and the lower side of the preceding vehicle region is positioned within a reference distance from an upper side of the augmented reality display region.

15. The apparatus according to claim 14, wherein the controller extracts an overlapping region between the preceding vehicle region and the augmented reality display region, and controls a size of the preceding vehicle information to a reference width when a width of the overlapping region is less than the reference width.

16. The apparatus according to claim 13, wherein the controller determines that the preceding vehicle is positioned at an lowermost end of the augmented reality display region when both endpoints of the lower side of the preceding vehicle region are positioned within the augmented reality display region and the lower side of the preceding vehicle region is positioned within a reference distance from a lower side of the augmented reality display region.

17. The apparatus according to claim 16, wherein the controller extracts an overlapping region between the preceding vehicle region and the augmented reality display region and when a sum of a height of the overlapping region and a height of the preceding vehicle information exceeds a height of the augmented reality display region, controls a position, a form, and a size of the preceding vehicle information.

* * * * *